Nov. 23, 1948. W. M. DUNSON 2,454,599
BABY DINING-PLAY-TABLE
Filed Nov. 1, 1946

INVENTOR
BY William M. Dunson
Clyde C. Balston
ATTORNEY

Patented Nov. 23, 1948

2,454,599

UNITED STATES PATENT OFFICE 2,454,599

BABY DINING-PLAY TABLE

William M. Dunson, Welaka, Fla.

Application November 1, 1946, Serial No. 707,245

3 Claims. (Cl. 155—123)

My invention has for its objects the production of a more sanitary, practicable and wheelable infant's portable flat top dining and play table than the conventional types thereof, which results I accomplish:

(1) By making the table top in one flat piece, free from food catching recesses fixtures and impediments, and by making the outer periphery considerably less in diameter than that of the base member of the apparatus and of the hereinafter named tires.

(2) By so constructing it that beside being movable over the floor in the ordinary manner on rollers or castors, it may be up-turned on its edge and readily and easily wheeled thereon along the floor and other surfaces and through narrow doorways and halls, as well as up and down steps, and even along the ground without the edge of the table member coming in contact with such unsanitary surfaces, and thereby saving the necessity of awkwardly lifting and carrying the considerably weighty apparatus from one room to another, or to different locations, and (3) To surround the top or table member of my apparatus with a continuous annulus constituting a rigid one-piece tire-guard rail of larger outer periphery than the diameter of the horizontal plane of said table top, said tire constituting also a continuous guard-rail disposed beyond and well above said table top surface, and serving also as a continuous hand-rail to facilitate the wheeling along of said apparatus when turned over on its edge and the tread surfaces of like outer periphery.

To accomplish said objects, reference is had to the accompanying drawings in which.

Figure 1:
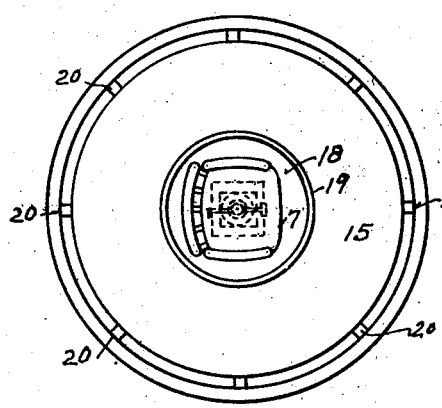
Fig. 1 is a plan view of my apparatus, showing principally the unobstructed rigid one piece plane table top, and the annular tire-guard rail disposed beyond the outer or peripheral edge of said table and constituting one of the two tires shown therein.
Figure 4:
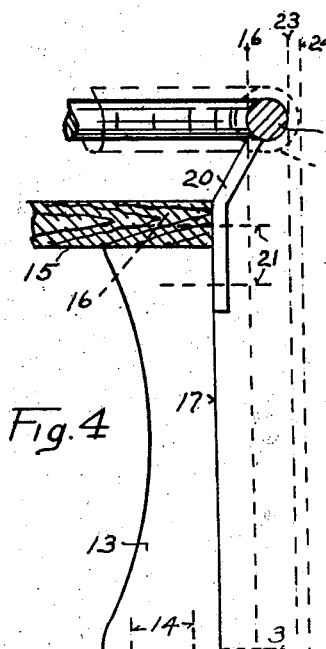
Fig. 4 shows a vertically disposed enlarged fragment—approximately on the line 4—4—of the right side of Fig. 2, partly in section, showing principally the manner of attaching said tire-guard rail above and beyond the outer edge of the table surface—also the base tire (in section) surrounding and attached to the base.
Figure 6:
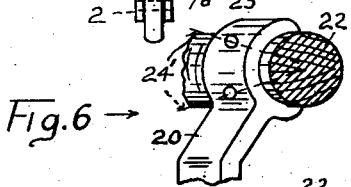
Figure 5:
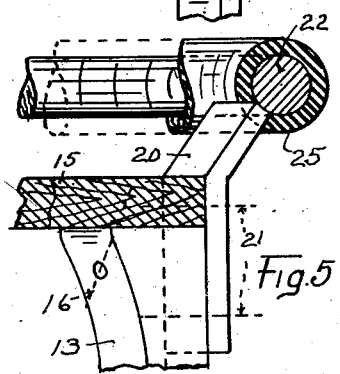

Fig. 5 is a geometric projection, enlarged, of the upper part of Fig. 4, showing the type of outwardly offset angular brackets used to support the annular tire-guard rail and also a portion (in section) of a tire fabric surrounding said rail; and Fig. 6 exhibits a form of said rail supporting bracket for attaching to and supporting a steel, rattan or other fibrous annular tire-guard rail, said tire being shown in section, and said tire and bracket being partly broken away.

Figure 7:
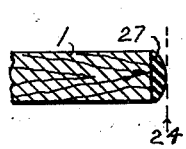

Fig. 7 exhibits, in section partly broken away, a form of tire tread.

Figure 2:
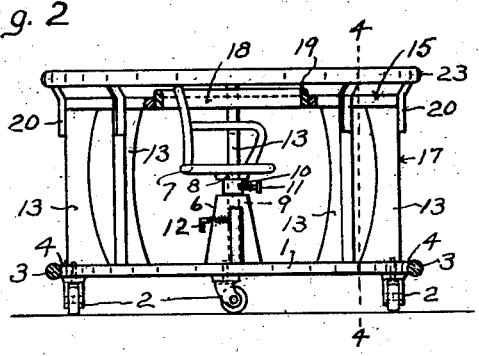
Fig. 2 represents a side elevation of Fig. 1, showing the middle of the table in section, also the tire disposed around the table base in section, and the apparatus mounted horizontally on castors, for the ordinary wheeling or rolling thereof horizontally over floor etc., surfaces.

In the accompanying drawings, 1 represents a horizontally disposed solid, flat circular platform or base mounted preferably on a plurality of conventional castors 2, having a tire tread 3 secured by any efficient means to the outer edge of said base, said tire being preferably bedded in a concave groove 4 formed around the periphery of said base, as shown in Figs. 2 and 4. Said base is preferably formed of one-half inch plywood, but may consist of any suitable material; and said tire may be formed of metal, rattan, or of other fibrous or suitable material as aforesaid, and may be covered by a resilient fabric, or covered by a small diameter canvas rubber hose, which may be split along one side longitudinally and forced over said tire, and cemented together thereon.

A pedestal 6 is secured to the base board 1 and supports an infant's conventional swivel chair 7, attached at 8 in any suitable manner to a rod 9 which is adapted to project downwardly into a corresponding vertical and centrally disposed receiving hole in said pedestal. A conventional slidable collar 10 surrounds said vertical rod 9 and may be bound thereto by a binding screw 11, to regulate the height of the chair above the base board and pedestal, with relation to a centrally disposed opening formed in the said superimposed table hereinafter described, and to the surface thereof. Another binding screw 12 of conventional type screwed into said pedestal is intended to hold the chair from swiveling, when desired, by its end impinging upon the rod 9.

Table supports 13, formed of any suitable material and in any serviceable manner or shape, but preferably of wood as shown, are securely attached to the top and extend vertically from the base 1, as for instance, by screws (not shown) the positions of which are, however, indicated by the dotted lines 14—14, Fig. 4.

On the top of said supports 13, is secured a flat one-piece circular table 15, disposed in a horizontal plane and formed of any suitable material, but preferably of one-half inch plyboard, which is also secured to said supports by screws (not shown) the positions of which are partly indicated by the dotted line 16, shown in Figs. 4 and 5.

Figure 3:
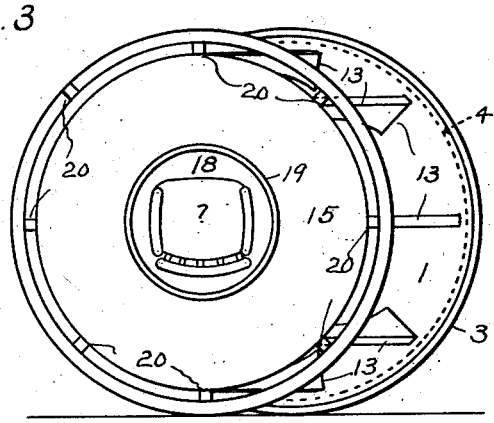
Fig. 3 is a vertical perspective view showing my apparatus turned over edgewise on to the outer tread periphery of said tire-guard rail and on to the outer tread periphery of its base member, into free wheeling position.

The horizontal plane of said table top 15 has an outer periphery considerably smaller than the periphery of the base board, as indicated by the vertical outer edge 17 of the supports 13—see Figs. 2 and 4. In the center of said table 15, directly above the chair 7, is provided a circular opening 18, surrounded by a conventional combing 19 and at equi-distant points around the periphery of said table are widely spaced and upwardly and outwardly angularly disposed metal brackets 20, Figs. 2 and 3, which brackets are shown in greater detail in Figs. 4, 5 and 6. Said brackets are secured by any suitable means, as by screws (not shown, the positions of which, however, are indicated by the dotted lines 21) both to the supports 13 and to the table 15, above the outer edge or periphery of which table said brackets extend and are bent outwardly as shown in Figs. 2, 4 and 5, the extreme upper ends of each of said brackets being spot-welded or otherwise securely attached to a stiff metal hoop or ring 22 constituting said tire-guard rail (as shown in Figs. 4 and 5), the outer periphery of which is the same as the similar periphery of the tire 3 surrounding the base board 1—the coincidence of the outer peripheries of which tires will be seen by their both meeting the vertical dotted line 23—23, Fig. 4.

Instead of being formed of metal said tire-guard rail hoop or ring 22 may be formed of fiber or other suitably stiff material, as indicated in Fig. 6, in which case the end of brackets 20 would preferably become concaved to fit the shape of said tire-guard rail, and be attached by screws, the positions of which are indicated by the dotted lines 24'. Also, the base tire may be formed and attached to the base as at 27, Fig. 7.

It is desirable, however, that the metal rings 3 and 22 (shown round in cross-section) be covered by a thick resilient material such as rubber hose, as shown in section at 25, Fig. 5, and as intended to be indicated by the circular dotted lines 5 and 26 of Fig. 4, the outer periphery of both of which resilient coverings shall then be of like extreme diameter, as indicated by the vertical dotted line 24.

The foregoing construction, in which the diameter of the table 15 is considerably less than that of the base 1, with the tire-guard rail 22 (or 26) raised well above the single flat, horizontal upper surface of said table and disposed well beyond the outer periphery thereof, in the manner and position described, leaves the whole one-piece table top surface absolutely unencumbered and free from food mess crevices, corners, nicks or other obstructions of an unsanitary nature, while providing a guard rail for dishes (and toys) thereby rendering said table surface easily wiped and thoroughly cleanable and sanitary, while the said lower tire and said upper tire-guard rail being of equal outer periphery, make it practicable and convenient to turn the apparatus on edge and instead of wearily carrying it, readily wheel it along to different locations, and through narrow door openings and hallways with great facility and ease.

The term tire, or tire-guard rail covers any suitable type of rigid tire or one formed of resilient material on a stiff core of small cross-sectional diameter, such as the compound type of tire-guard rail type described and illustrated herein, also its purpose as a hand-rail to assist in wheeling the apparatus along. The term "metal ring" means an annulus of any suitably stiff material and form.

It is understood that I make no broad claim of invention to a conventional circular base element on which is supported a table element, or to the central revolving chair and the central opening in the table therefor, or to the means of supporting the chair in said apparatus.

What I claim, however, is:

1. In an infant's play-dining apparatus having a wide flat circular platform base member disposed in a horizontal plane, supporting means for said member, a flat circular one piece table top member disposed in like horizontal plane parallel with and well above said platform member and firmly secured thereto by spaced supports disposed therebetween, and having a rotatable chair centrally disposed in and supported by said apparatus and having an opening for said chair formed through said flat table top member, disposed above and surrounding the vertical axis of the area occupied by said chair, said table top member having an outer periphery considerably less than the periphery of said platform member and being surrounded by an annulus of relatively small cross-section constituting a rigidly fixed tire-guard rail having a considerably larger outer periphery than the periphery of said table top member, and means comprising spaced brackets connected integrally with said annulus and with said table top member to firmly hold said annulus in elevated position well above and outside of the outer edge of said table member, the outer periphery of said tire and of said platform member comprising wheeling tread surfaces of like outer peripheries respectively, to enable said apparatus to be evenly wheeled along thereon when said tires rest on a tread surface.

2. In an infant's portable play-dining apparatus comprising a circular base member, supporting means for said member, and a centrally supported chair, and having a flat circular table top member supported by standards affixed to said base member, and said table top member having a central opening formed therethrough above and around the area occupied by said chair, said table top member comprising a flat horizontally disposed one piece play-dining surface and an outer periphery considerably smaller than the outer periphery of said base member, and being unencumbered and free of any objects, crevices and food obstructions on said surface, an annularly disposed tread surface comprising the outer periphery of said base member, and an annulus having a tread surface of equal outer periphery supported well above and outside of the outer periphery of said table top member, thereby comprising a wide open annular sanitary space therebetween, means disposed between said annulus and the outer edge of said table top member to firmly support said annulus, said annulus supporting means comprising angularly formed brackets integrally connected with said annulus and with said table member at spaced distances therearound.

3. In an infant's play-dining apparatus having the characteristics of claim 1, said apparatus being capable of two different types of movement, one of said means comprising casters secured to the platform of said apparatus to facilitate normal horizontal movement thereof over a tread surface, and the other of said means comprising paralell annular treads of equal circumference spaced widely apart respectively near the top and bottom of said apparatus, and comprising respectively the outer periphery of said elevated annulus and the outer periphery of said platform, whereby wheeling movement may be imparted to said apparatus when disposed in vertical position on a tread surface.

WILLIAM M. DUNSON.

REFERENCES CITED

The following references are of record in the file of this patent:

UNITED STATES PATENTS

| Number | Name | Date |
|---|---|---|
| 1,313,330 | Pocock | Aug. 19, 1919 |
| 1,618,646 | Fisher | Feb. 22, 1927 |
| 1,826,502 | Brown | Oct. 26, 1932 |
| 2,235,598 | Wisecarver | Mar. 18, 1941 |